US007007087B1

(12) United States Patent
Souma et al.

(10) Patent No.: US 7,007,087 B1
(45) Date of Patent: Feb. 28, 2006

(54) SYSTEM AND METHOD FOR REJECTING SERVICES IN A INFORMATION SERVICE SYSTEM

(75) Inventors: Kazuya Souma, Yokohama (JP); Akira Mineo, Sagamihara (JP); Kenji Kimoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 724 days.

(21) Appl. No.: 09/644,892

(22) Filed: Aug. 24, 2000

(30) Foreign Application Priority Data

Aug. 31, 1999 (JP) ................................ 11-244166

(51) Int. Cl.
G06F 15/173 (2006.01)
G06F 15/16 (2006.01)
G06F 11/00 (2006.01)

(52) U.S. Cl. ...................... 709/225; 709/203; 709/223; 370/230

(58) Field of Classification Search ................ 709/203, 709/223, 224, 225; 370/230, 232, 235, 236
See application file for complete search history.

(56) References Cited

U.S. PATENT DOCUMENTS

| 5,313,454 | A | * | 5/1994 | Bustini et al. ............... 370/231 |
| 5,359,320 | A | * | 10/1994 | Jaffe et al. .................. 370/448 |
| 5,367,523 | A | * | 11/1994 | Chang et al. ................ 370/235 |
| 5,544,327 | A | * | 8/1996 | Dan et al. .................... 709/234 |
| 5,568,612 | A | * | 10/1996 | Barrett et al. ............... 709/203 |
| 5,727,002 | A | * | 3/1998 | Miller et al. ................. 714/748 |
| 5,768,258 | A | * | 6/1998 | Van As et al. ............... 370/236 |
| 5,799,002 | A | * | 8/1998 | Krishnan ..................... 370/234 |
| 5,812,526 | A | * | 9/1998 | Chang et al. ................ 370/230 |
| 5,928,331 | A | * | 7/1999 | Bushmitch .................. 709/231 |
| 5,938,732 | A | * | 8/1999 | Lim et al. .................... 709/229 |
| 6,006,269 | A | * | 12/1999 | Phaal .......................... 709/227 |

(Continued)

FOREIGN PATENT DOCUMENTS

JP        06-284187        10/1994

(Continued)

OTHER PUBLICATIONS

"Host Extensions for IP Multicasting" Aug. 1989 IETF Network Working Group Request for Comments:1112 Obsoletes :RFCs 988, 1054.

*Primary Examiner*—Saleh Najjar
*Assistant Examiner*—Kevin T Bates
(74) *Attorney, Agent, or Firm*—Mattingly, Stanger, Malur & Brundidge, P.C.

(57) ABSTRACT

The service use requirement issue from the user is rejected by holding the threshold value for starting and releasing the service reject in response to the load in the side for providing the information communication service and multicasting the service reject information including the device in the users who do not issue the service requirement using the route with which each user transmits the requirement to the information communication service system when a load in the side for providing the information communication service becomes high and it is determined that the service reject is started. As explained above, when an information service system such as the shopping service system is placed in the overload condition, the service use requirement can be rejected from the user side device to ease the load of the service provision system.

10 Claims, 15 Drawing Sheets

U.S. PATENT DOCUMENTS

| | | | |
|---|---|---|---|
| 6,125,397 A * | 9/2000 | Yoshimura et al. | 709/235 |
| 6,230,205 B1 * | 5/2001 | Garrity et al. | 709/231 |
| 6,349,340 B1 * | 2/2002 | Dyer et al. | 709/231 |
| 6,360,270 B1 * | 3/2002 | Cherkasova et al. | 709/229 |
| 6,490,249 B1 * | 12/2002 | Aboul-Magd et al. | 370/232 |
| 6,539,000 B1 * | 3/2003 | Murai et al. | 370/260 |

FOREIGN PATENT DOCUMENTS

| | | |
|---|---|---|
| JP | 08-213981 | 8/1996 |
| JP | 10-97476 | 4/1998 |

* cited by examiner

FIG. 2

| CLASS OF THRESHOLD VALUE | REJECT CONDITION ITEM | THRESHOLD VALUE | |
|---|---|---|---|
| REJECT START THRESHOLD VALUE | PROCESSOR USE COEFFICIENT | 90% | T201 |
| REJECT RELEASE THRESHOLD VALUE | | 70% | T202 |

FIG. 3

| CLASS OF REJECT INFORMATION | INFORMATION | |
|---|---|---|
| CLASS OF SERVER | SHOPPING SERVER 1111 | T301 |
| CLASS OF SERVICE | SHOPPING SERVICE 2222 | T302 |
| CLASS OF REJECT | SERVICE USE REQUIREMENT ISSUE RESTRAINT | T303 |
| REJECT MESSAGE | IT IS VERY BUSY NOW AND YOU CANNOT USE THIS SERVICE. PLEASE, USE THIS SERVICE AGAIN, LATER | T304 |

FIG. 4

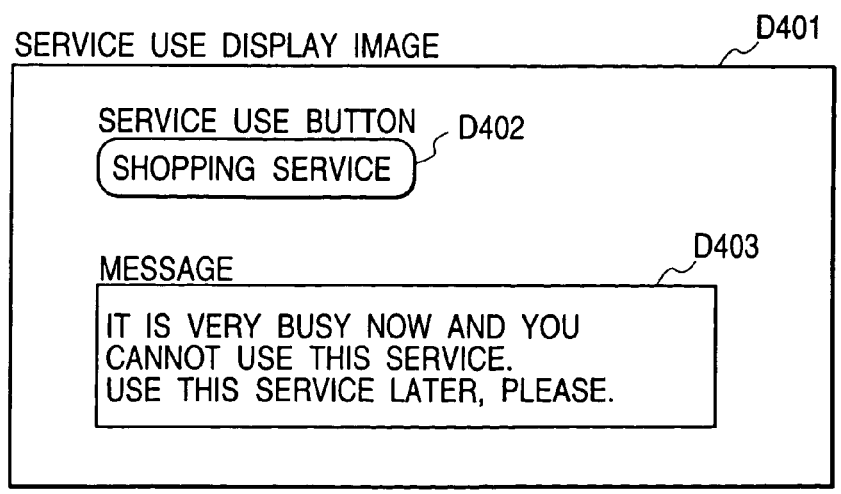

| CLASS OF REJECT INFORMATION | INFORMATION | |
|---|---|---|
| CLASS OF SERVER | SHOPPING SERVER 1111 | TB01 |
| CLASS OF SERVICE | SHOPPING SERVICE 2222 | TB02 |
| CLASS OF REJECT | SERVICE USE REQUIREMENT ISSUE FIXED TIME RESTRAINT | TB03 |
| REJECT MESSAGE | IT IS VERY BUSY NOW AND YOU CANNOT USE THIS SERVICE. PLEASE, USE THIS SERVICE AFTER xxx MINUTES. | TB04 |
| RESTRAINT TIME | 10 MINUTES | TB05 |

FIG. 15

| CLASS OF THRESHOLD VALUE | THRESHOLD VALUE | RESTRAINT TIME | |
|---|---|---|---|
| REJECT START THRESHOLD VALUE | 90% | 30min | TF01 |
| REJECT START THRESHOLD VALUE | 85% | 15min | TF02 |
| REJECT START THRESHOLD VALUE | 80% | 10min | TF03 |
| REJECT START THRESHOLD VALUE | 75% | 5min | TF04 |
| REJECT RELEASE THRESHOLD VALUE | 70% | - | TF05 |

FIG. 16

| CLASS OF REJECT INFORMATION | INFORMATION | |
|---|---|---|
| CLASS OF SERVER | SHOPPING SERVER 1111 | TG01 |
| CLASS OF SERVICE | SHOPPING SERVICE 2222 | TG02 |
| CLASS OF REJECT | SERVICE USE REQUIREMENT ISSUE VARIABLE TIME RESTRAINT | TG03 |
| REJECT MESSAGE | IT IS VERY BUSY NOW AND YOU CANNOT USE THIS SERVICE. PLEASE, USE THIS SERVICE AFTER xxxx MINUTES. | TG04 |

FIG. 17

| CLASS OF REJECT INFORMATION | INFORMATION | |
|---|---|---|
| CLASS OF SERVER | SHOPPING SERVER 1111 | TH01 |
| CLASS OF SERVICE | SHOPPING SERVICE 2222 | TH02 |
| CLASS OF REJECT | SERVICE USE REQUIREMENT ISSUE RANK RESTRAINT | TH03 |
| REJECT MESSAGE | IT IS VERY BUSY NOW AND YOU CANNOT USE THIS SERVICE. PLEASE, USE THIS SERVICE AGAIN, LATER | TH04 |
| REJECT OBJECT RANK | C | TH05 |

FIG. 19

| CLASS OF SERVER | CLASS OF SERVICE | SERVICE CONDITION | REJECT INFORMATION POINTER | ACCEPT TIME |
|---|---|---|---|---|
| SHOPPING SERVER 1111 | SHOPPING SERVICE 2222 | IN THE SERVICE REJECT CONDITION | | 1999/7/1 18:21:50 |
| SHOPPING SERVER 5555 | SHOPPING SERVICE 6666 | IN THE SERVICE REJECT CONDITION | | 1999/7/1 18:22:32 |

TJ01, TJ02, TJ03, TJ04, TJ05

| CLASS OF REJECT INFORMATION | INFORMATION |
|---|---|
| CLASS OF REJECT | SERVICE USE REQUIREMENT ISSUE RESTRAINT |
| REJECT MESSAGE | IT IS VERY BUSY NOW AND YOU CANNOT USE THIS SERVICE. PLEASE, USE THIS SERVICE AGAIN, LATER. |

| CLASS OF REJECT INFORMATION | INFORMATION |
|---|---|
| CLASS OF REJECT | SERVICE USE REQUIREMENT ISSUE RESTRAINT |
| REJECT MESSAGE | IT IS VERY BUSY NOW AND YOU CANNOT USE THIS SERVICE. PLEASE, USE THIS SERVICE AGAIN, LATER. |

SYSTEM AND METHOD FOR REJECTING SERVICES IN A INFORMATION SERVICE SYSTEM

BACKGROUND OF THE INVENTION

1. Field of the Invention

The present invention relates to the technique to reject service use requirement issue from users in the service provision system.

2. Description of the Related Arts

The Japanese Unexamined Patent Publication No. H6-284187 discloses a system providing a plurality of service switching points for switching between subscriber terminals and virtual private network and a system control processor for controlling such service switching points through the communication network. In this system, the system control processor measures traffics corresponding to classes of the private networks and transmits a reject signal to the service switching points in regard to the traffics exceeding the preset threshold value. Each service switching point abandons respective requirement signal depending on such reject signal. Thereby, such a delicate process that the calls in regard to the particular services resulting in the overload or the calls in regard to the private network used by the particular customers are rejected and the call connections to the other services are established can be realized.

Moreover, Japanese Unexamined Patent Publication No. H10-97474 discloses that when an information communication service use requirement is issued to a service provider from an end user, the service provider gives the priority to the community which is the information to determine the activity range of a user on the network and distributes this community to the user via the network and thereby the end user can perform the processes for acquisition, completion, moving, intermission and recovery on the basis of this community. Thereby, congestion of closed network, for example, in the company can be prevented by preferentially executing the community having higher priority.

Moreover, Japanese Unexamined Patent Publication No. H8-213981 discloses that a logical another line is provided between the host and a plurality of terminals in the theoretical 1:n communication between the host and a plurality of terminals and thereby congestion message is notified at a time to the terminals.

SUMMARY OF THE INVENTION

In the related art system described in Japanese Unexamined Patent Publication No. H6-284187, the service requirement is abandoned at the service switching points. Therefore, load of the system control processor can be eased. However, service requirement to the service switching point from the subscriber terminal is not yet rejected.

For example, when a panicked condition is caused with a catastrophe wherein connection requirement for telephone service is concentrated or in the ticket selling condition where such connection requirement is concentrated within the particular time, there are fears that over-load occurs at the service switching point to which a plurality of subscriber terminals (users) are connected and thereby the subscribers (users) connected to the service switching point cannot use the services.

Namely, in the related art method disclosed in Japanese Unexamined Patent Publication No. H6-284187, since it is impossible to reject generation of a large amount connection requirement (service use requirement) itself from the subscriber terminals (user terminals) any consideration is not taken for the over-load control at the service switching points as the facilities in the service provider side. Moreover, since a large amount of connection requirement (service use requirement) occurs in the network connecting the subscribers (users) and service switching points, nothing is considered to the condition that a load is applied to the network connecting the subscribers (users) and service switching points.

Moreover, when a user issues again the service use requirement because of rejection for service use requirement, the information service system is further over-loaded and thereby the traffics are always in the congesting condition.

In addition, in the related art system disclosed in Japanese Unexamined Patent Publication No. H10-97476, the service use requirement issue is controlled by giving the reject information to the responses to the service use requirements from users. Therefore, the service use requirement issue from the particular users can be controlled but if the service use requirements are issued simultaneously from many users, there rises a problem that the information service system is over-loaded because the reject information must be transmitted individually.

For example, in a shopping service system, the service use requirement issue from a certain user may be controlled by giving the reject information to the response to the service use requirement from such user. However, since the reject information is not distributed to the other users, the other users will issue the service use requirement without relation to the reject information for the shopping service system. Therefore, for example, when the ticket sales is started, the service use requirement issue from users is concentrated and thereby there rises a problem that the shopping service system is overloaded.

Moreover, if the shopping service system is overloaded and it cannot return the answer to the service use requirement, a user reissues the service use requirement. Thereby, the overload condition of shopping service system is further deteriorated.

Moreover, in an example of the hand-held telephone network, the network will be overloaded to generate the connection disabling condition in such a period that the working peoples are returning to homes where the service use requirement (dialing) is concentrated. In this case, if users try the redialing, there rises a problem that the overload condition of the hand-held telephone network is further deteriorated.

In addition, in Japanese Unexamined Patent Publication No. H8-213981, a theoretical another line is required in addition to the line for data transfer in order to notify the congesting condition. As a result, the additional system resources are required for such another line.

SUMMARY OF THE INVENTION

It is therefore an object of the present invention to provide an information communication service provision system to effectively avoid the overload condition of the network.

In view of achieving the object explained above, the information communication service provision system comprises a service reject control part for determining whether the service reject information should be issued or not by measuring the load condition of a service provisioning part, a service reject information table for storing the service reject information and a service reject information issue part for issuing the service reject information to a service use client and moreover a means for transmitting, when the service reject control part detects that the load condition of the service provision system has exceeded the threshold value, the service reject information stored in the service reject information table, with the same rout as the data, not only to the service use clients who have issued the service requirement in which the load exceeds the predetermined threshold value but also to the other service use clients who have not issued the service requirement from the service reject information issue part.

Moreover, the aforementioned service use client comprises a service reject information accept part for accepting the service reject information issued from the service provision system, a service use requirement issue control table for storing the service reject information accepted with the service reject information accept part, a service use requirement issue control part for determining whether the service use requirement accepted from user should be issued or not based on the service use requirement issue control table and a means for controlling the service use requirement issue in the service use client side based on the service reject information issued to the service use client from the service provision system.

BRIEF DESCRIPTION OF THE SEVERAL VIEWS OF THE DRAWING

FIG. 2 is a load threshold value table.

FIG. 3 is a service reject information table.

FIG. 4 is an image diagram of the service use display image for notifying the service reject condition to users.

FIG. 15 is a load threshold value table.

FIG. 16 is a service reject information table.

FIG. 17 is a service reject information table.

FIG. 19 is a service use requirement issue control table.

DETAILED DESCRIPTION OF THE INVENTION

The shopping service system as an example of the preferred embodiment of the present invention will be explained with reference to FIG. 1 to FIG. 20.

Figure 1:
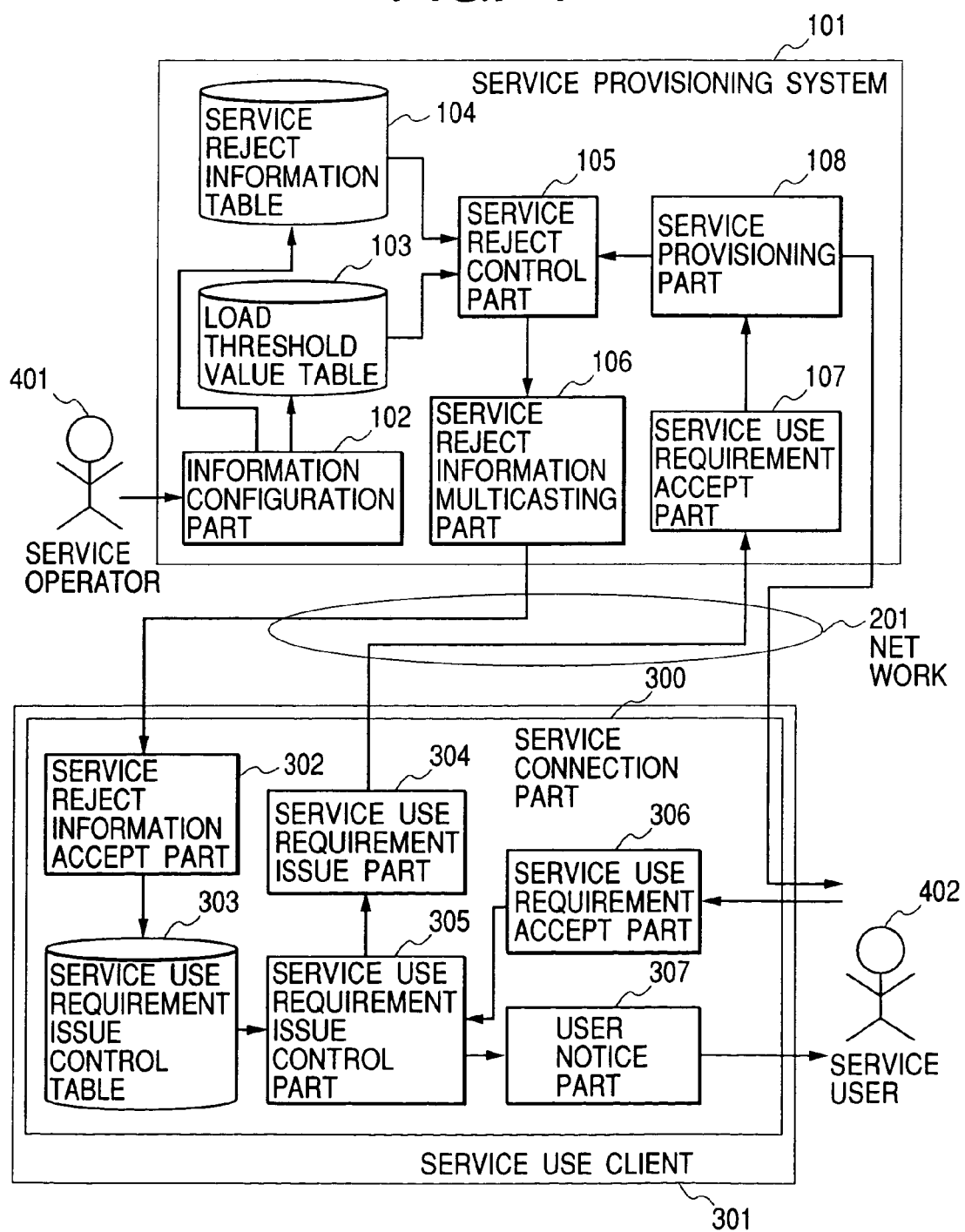
FIG. 1 is a block diagram of the shopping service system illustrating a preferred embodiment of the present invention.

FIG. 1 illustrates the total structure of the shopping service system. In this system, the service provision system 101 comprises a service provisioning part 108 for providing the shopping service, a service use requirement accept part 107 for accepting the service use requirement from the users 402, a load threshold value table 103 for storing the load threshold value which is the reference value for determining whether the service reject information should be issued or not depending on the load of the service provisioning part 108, a service reject control part 105 for determining whether the service reject information should be issued or not depending on the load threshold value table 103, a service reject information table 104 for storing the service reject method in the service use client, a service reject information multicasting part 106 for multicasting the service reject information to the service use clients and an information configuration part 102 for respectively setting the load threshold value and service reject information to the load threshold value table 103 and service reject information table 104.

Figure 10:
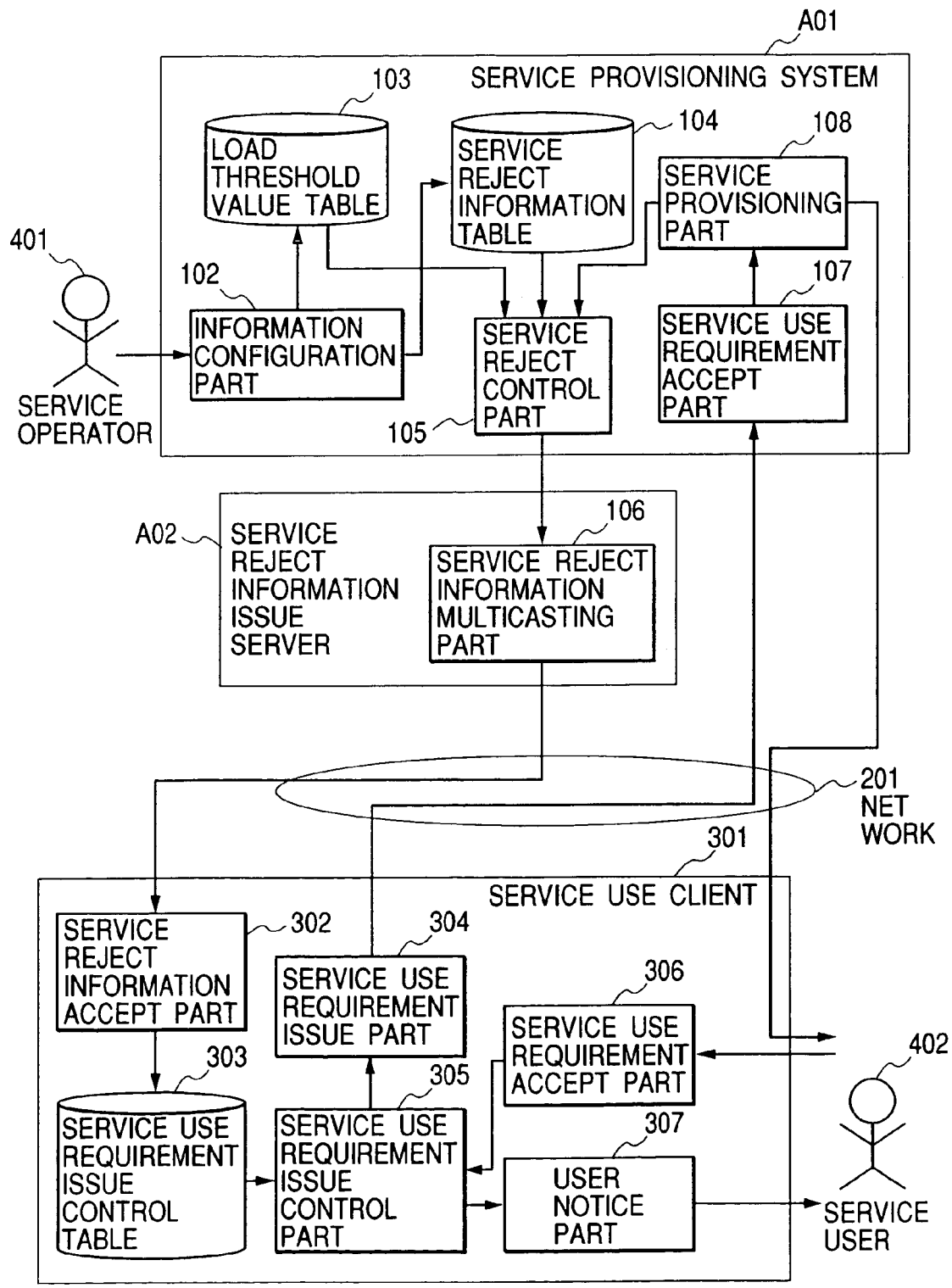
FIG. 10 is a block diagram in the case that the service reject information issue part is provided in the other server in the block diagram of the shopping service system as the preferred embodiment of the present invention.

Moreover, as the structure of the other embodiment of service provision system, the service providing service provision system A01 may be separated from the service reject information issuing service reject information issue server A02 as illustrated in FIG. 10.

Figure 20:
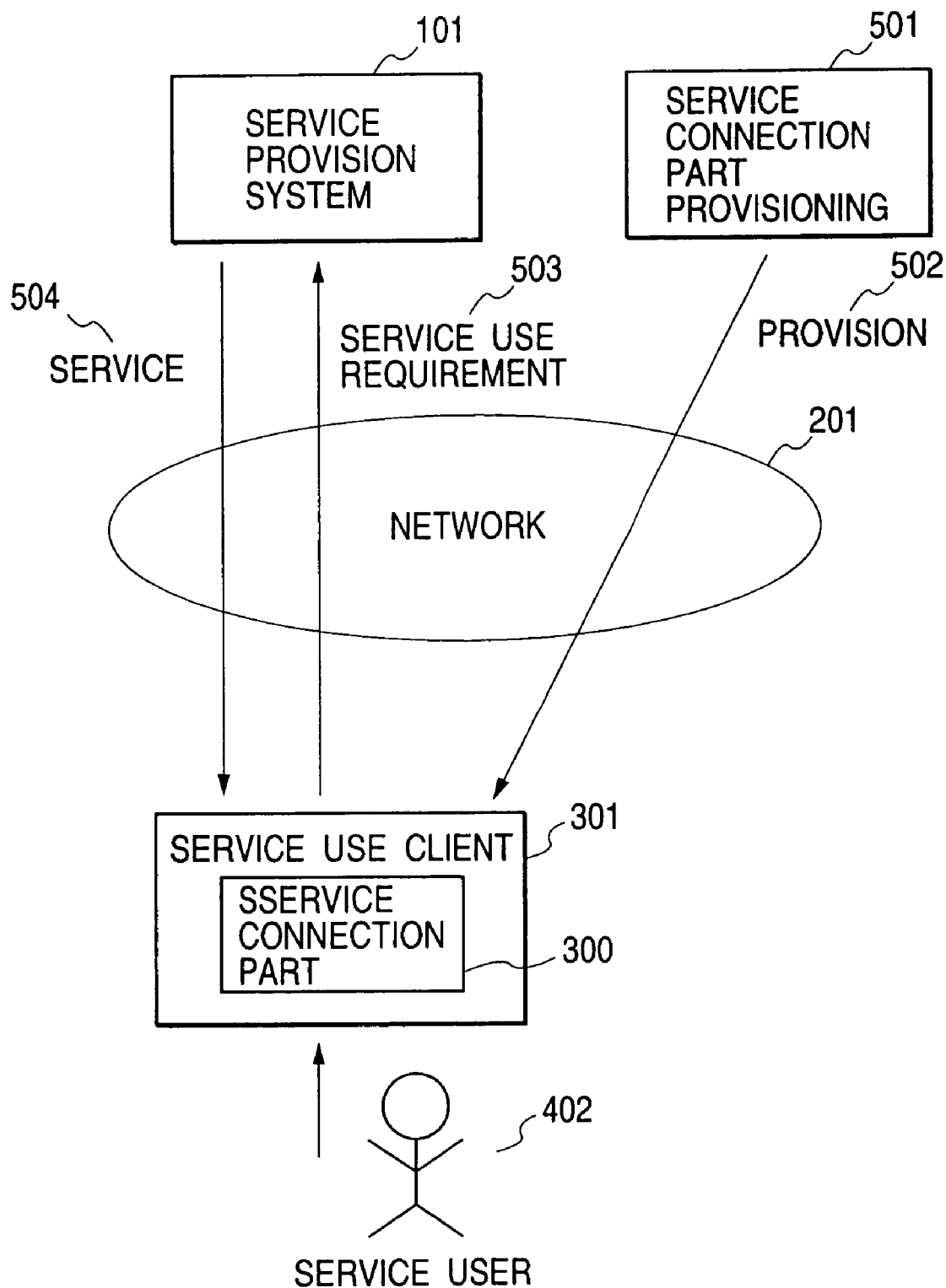
FIG. 20 is a diagram illustrating an example of the system comprising the service clients having the service connection part of the present invention.

Moreover, the service use client 301 comprises a service connection part 300 for connection to the service provision system based on the service reject information. As illustrated in FIG. 20, the service use client 301 prepares the service connection part 300 required for connection with the service provision system 101 before the connection with the service provision system 101. In more practical, prior to the process, the necessary programs are loaded.

As explained above, the programs of the service connection part 300 may be loaded because of following reasons.

As the service use client 301, a plurality of types can be assumed but these types of clients are not always provided the function to restrain the service use requirement issue based on the service reject information which will be explained later. Therefore, it is possible to provide the function to restrain the similar service use requirement to various types of service use clients by initially loading the programs having the function explained above.

FIG. 20 illustrates a system for providing the service connection part (distributing the necessary programs to each client) with an additionally provided service connection part provisioning server 501 in view of applying no load to the service provision system 101 in the provisioning process of the service connection part 300. A user 402 obtains the service provisioning part 300 by extending the connection to the service connection part provisioning server 501 from the service use client 301. Moreover, it is also possible to use the software which may be down-loaded from the service connection part provisioning server 501 and can be operated in direct without installation thereof just like the Java Applet. In the embodiment of FIG. 20, an example of obtaining the server connection part 300 via the network has been explained, but such software may be installed previously to the service use client 301 using the software storing medium such as CD-ROM and ROM (Read Only Memory). Moreover, when the service connection part provisioning server 501 is included in the service provision system 101, it is also possible to previously provide the service connection part 300 when the load is rather low in the service provision system 101.

Here, the service provision system (server) 101 and the system in the service providing side such as the service reject information issue server A02 of FIG. 10 and the service connection part provisioning server 501 of FIG. 20 are generally called an information service system including the modification examples.

The service connection part 300 has the structure comprising a service reject information accept part 302 for accepting the service reject information from the service provision system 101, a service use requirement issue control table 303 for storing the service reject information accepted from the service provision system 101, a service use requirement accept part 306 for accepting the service use requirement from the user 402, a service use requirement issue control part 305 for determining whether the service use requirement should be issued or not depending on the service use requirement issue control table 303, a service use requirement issue part 304 for issuing the service use requirement and a user notice part 307 for notifying acceptance of the service reject information to a user 402 when such service reject information is accepted.

The load threshold value table 103 stores, as illustrated in FIG. 2, the service reject start threshold value T201 which is the threshold value for determining the start of service reject based on the load of the service provisioning part 108 and the service reject release threshold value T202 which is the threshold value for determining release of service reject.

The load of the service provisioning part 108 explained here indicates the utilizing condition of the resources used in the services for provided to users 402 with the service provisioning part 108 such as a busy coefficient of processor, application coefficient of memory and buffer, application coefficient of disc space and input/output application coefficient of network and disc. In the shopping service system illustrated in FIG. 2, the application coefficient of processor of the service provisioning part 108 is considered as an example of the load of the service provisioning part 108 and any kind of load which gives influence on the service quality such as input/output application coefficient of the network and disc can be considered as the load of the service provisioning part 108.

The service reject information table 104 stores, as illustrated in FIG. 3, a class of server T301, a class of service T302 and a service use requirement issue restraint as a class of reject T303 and a reject message T304 to notify invalidity of service use to users such as "It is very busy now and you cannot use this service. Please use gain this service later."

Figure 5:
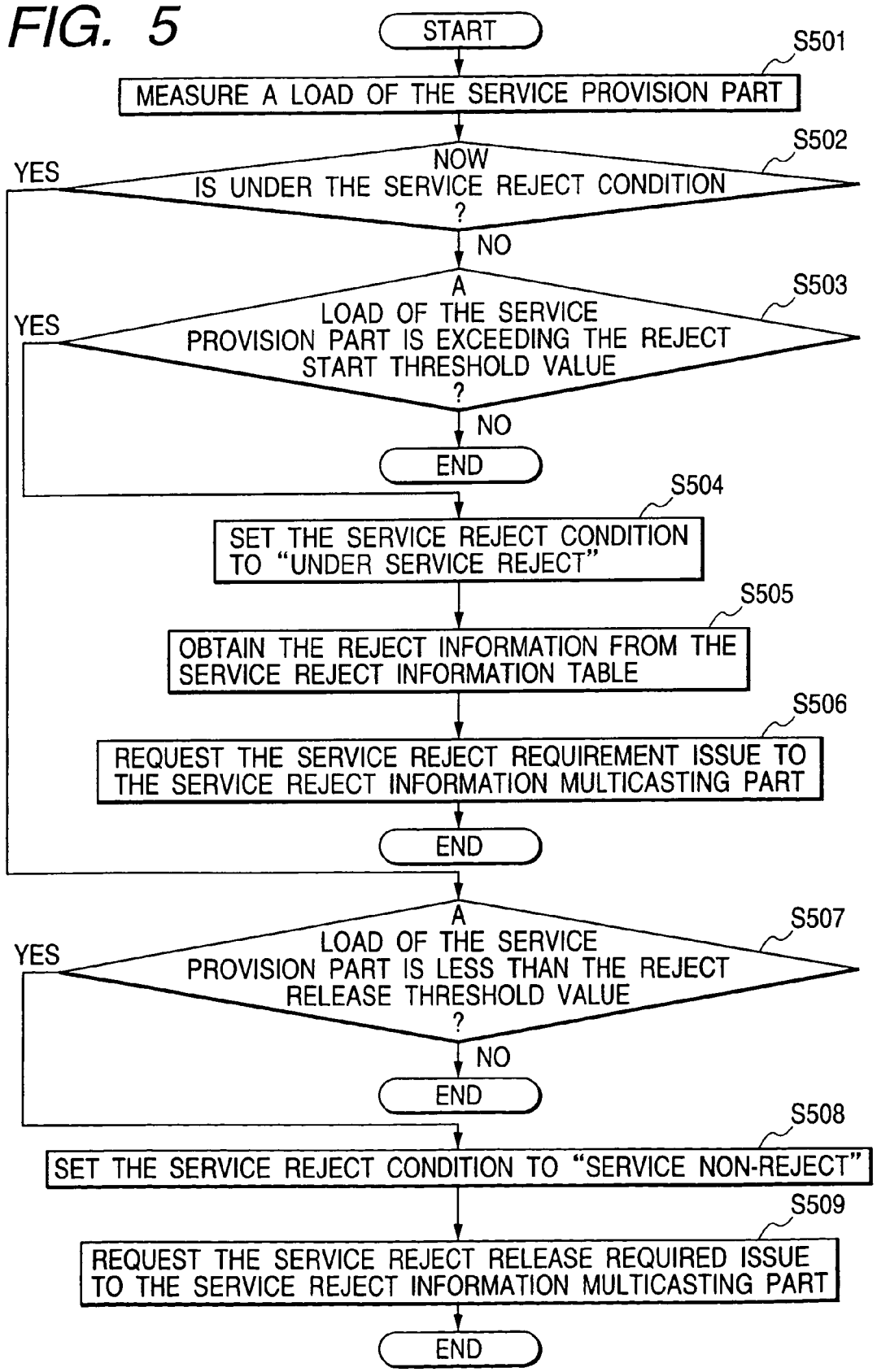
FIG. 5 is a flowchart illustrating the process of service reject control part.

The service reject control part 105 periodically measures the load condition of the service provisioning part 108 and determines whether the service reject information should be issued or not depending on the result of measurement and load threshold value table 103. This process is illustrated in FIG. 5. Each step of this process will be explained below.

The service reject control part 105 measures the load of the service provisioning part 108(S501), determines the current service reject condition (S502) and compares, when the current service reject condition is not effective, the load of the service provisioning part 108 with the service reject start threshold value T201 of the load threshold value table 103 (S503). When the load of the service provisioning part 108 does not exceed the service reject start threshold value T201 of the load threshold value table 103, the process is completed. When the load of the service provisioning part 108 exceeds the service reject start threshold value T201 of the load threshold value table 103, the service reject condition is set to "service reject condition" (S504), the reject information pieces T301 to T404 are obtained from the service reject information table 104 (S505) and the service reject requirement issue is requested to the service reject information multicasting part 106 (S506).

In the step S502, when the current service reject condition is effective, the load of the service provisioning part 108 is compared with the service reject release threshold value T202 of the load threshold value table 103 (S507). When the load of the service provisioning part 108 is not lower than the service reject release threshold value T202 of the load threshold value table 103, the process is completed. When the load of the service provisioning part 108 is lower than the service reject release threshold value T202 of the load threshold value table 103, the service reject condition is set to "Service non-reject condition" (S508) and the service reject release requirement issue is requested to the service reject information multicasting part 106 (S509). Here, the service reject information of which issue is requested to the service reject information multicasting part 106 should include the contents of the service reject information table 104.

Figure 6:
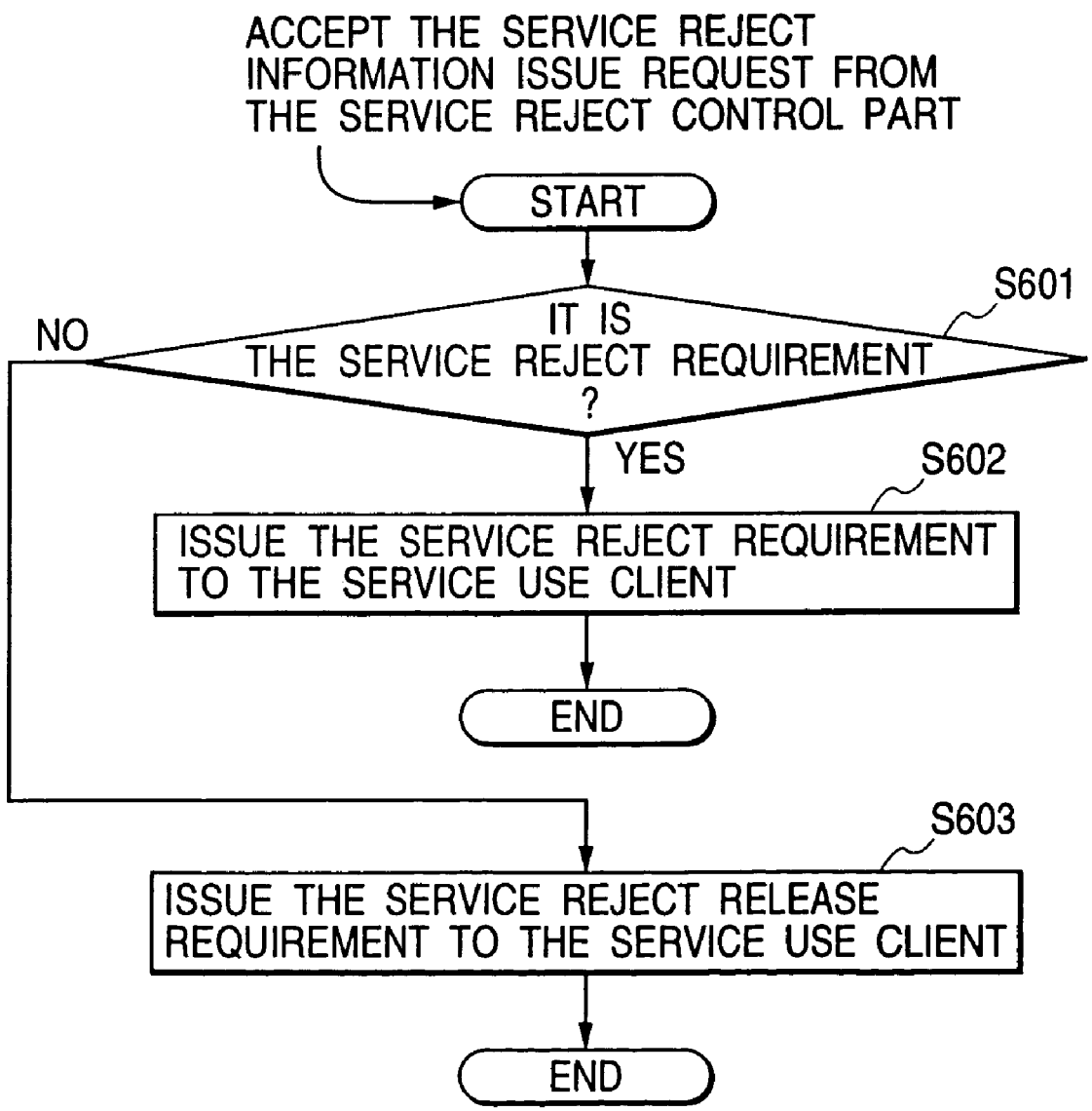
FIG. 6 is a flowchart illustrating the process of service reject information issue part.

The service reject information multicasting part 106 issues, upon reception of request from the service reject control part 105, the service reject information to the service use client 301. This process is illustrated in FIG. 6. Each step of this process is explained below.

The service reject information multicasting part 106 determines contents of the request from the service reject control part 105 (S601) and issues, when it is the request of the service reject requirement issue, service reject requirement to the service use client 301 (S602). When the request from the service reject control part 105 has a content of service reject release requirement issue, the service reject release requirement is issued to the service use client 301 (S603).

Here, as a means for issuing simultaneously the service reject requirement or service reject release requirement to many service use clients 301, for example, a multicasting protocol which is called the IP multicast protocol may be used. The IP multicast protocol is realized with the protocol called IGMP (Internet Group Management Protocol) and the service reject information multicasting part 106 is capable of realizing the multicast to many service use clients 301 by transmitting the service reject information to the multicast addresses.

In the IP multicast, it is enough to transmit only one data to the particular multicast address from the information originating side. A receiving side transmits a request to receive multicast distribution to a router using IGMP. The router distributes the data while it is automatically copied only in the direction where the users who desire the reception exist by means of the multicast routing. As explained above, a large amount of data can be transferred to many sites. In the multicast, a little difference is generated in the data receiving times but it is possible to expect the almost simultaneous reception of data.

Here, the service reject information multicast is not limited only to the multicast means and does not request simultaneous property and means only distribution of the same contents to many receiving sides when the transmitting side is once aware of transmission of data.

As a means of simultaneously transmitting the service reject information to many service use clients 301, any means which can make the simultaneous transmission such as satellite digital broadcast, ground-wave digital broadcast and hand-held telephone base station or the like may be used in addition to the IP multicast protocol explained above.

Here, the multicast of service reject information takes the same route as the ordinary data transmission and reception and does not require the other particular line (even when it is logical) for multicast. The same route used here is used in the sense of the same route in the IP address level.

Figure 7:
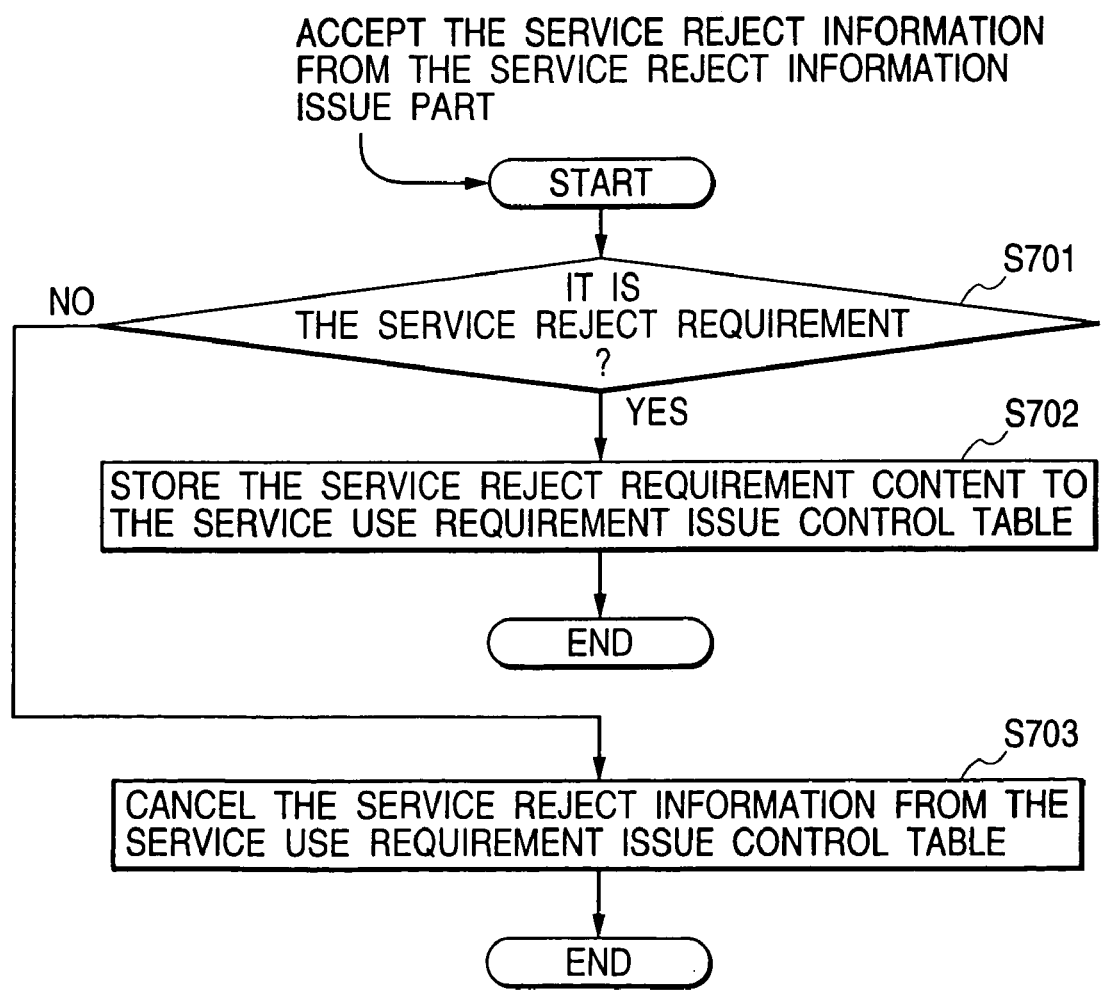
FIG. 7 is a flowchart illustrating the process of service reject information accept part.

The service reject information accept part 302 accepts the service reject information from the service reject information multicasting part 106 and stores the contents thereof to the service use requirement issue control table 303. This process is illustrated in FIG. 7. Each step of this process will be explained below. Moreover, contents of the service use requirement issue control table 303 are illustrated in FIG. 19.

The service reject information accept part 302 determines contents received from the service reject information multicasting part 106 (S701) and stores, when it is the service reject requirement, the contents to the service use requirement issue control table 303 (S702). The contents to be stored in the service use requirement issue control table 303 include, as illustrated in FIG. 19, the contents (indicated by TJ01, TJ02, TJO4) received from the service reject information multicasting part 106, service condition TJ03 indicating that the service of the service provision system is under the service reject condition and the accept time TJO5 indicating the time when the service reject requirement is accepted. When the service reject requirements are accepted simultaneously from the service provision systems for the services of a plurality of classes, a plurality of regions are provided to store such information for each service. When the content received from the service reject information multicasting part 106 is the service reject release requirement, the service reject information (Tj01 to TjO5) of the relevant service of the service provision system is deleted from the service use requirement issue control table 303 (S703).

Figure 8:
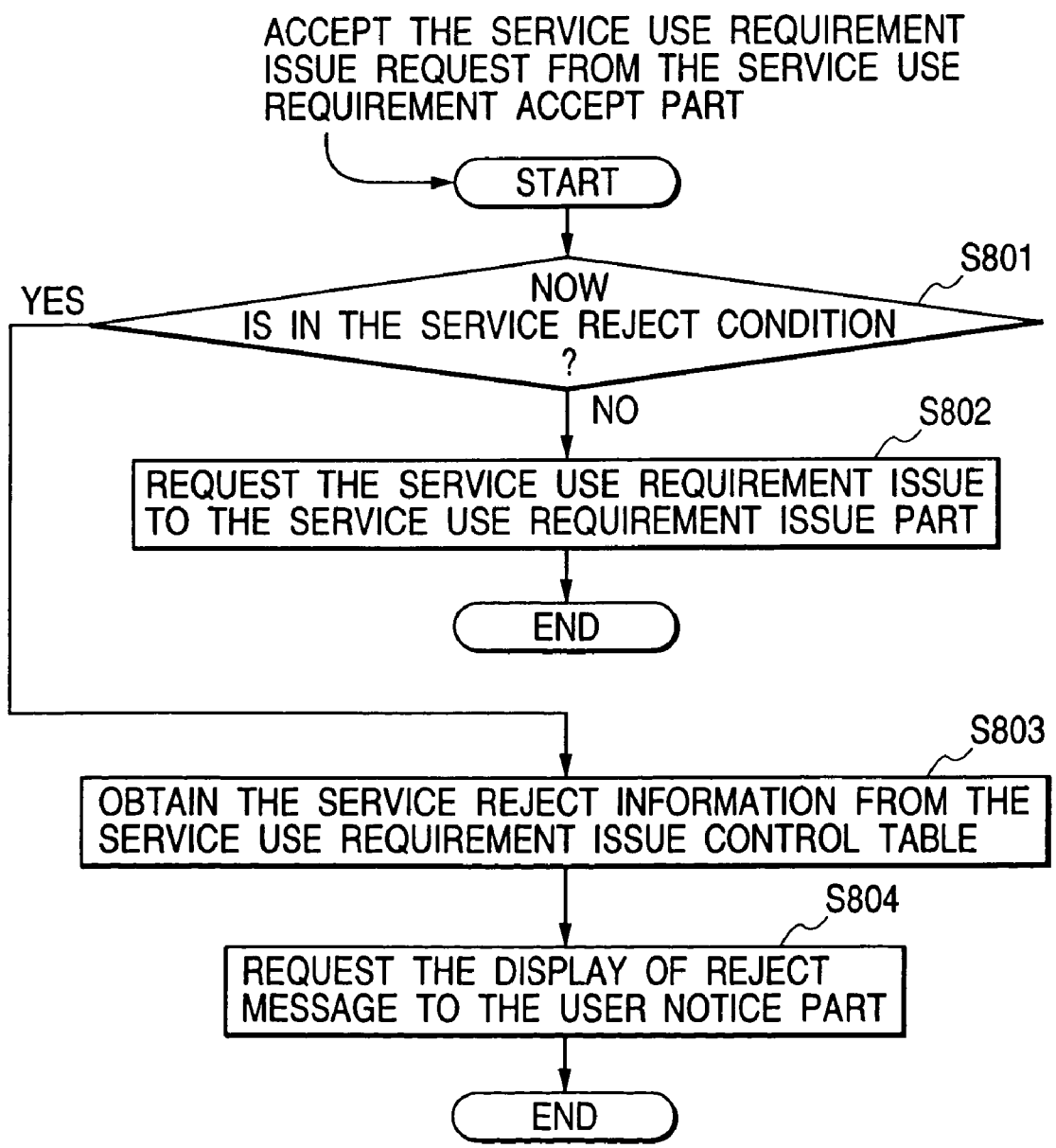
FIG. 8 is a flowchart illustrating the process of service use requirement issue control part.

The service use requirement issue control part 305 accepts the request for service use requirement issue from the service use requirement accept part 306 and controls the issue of the service use requirement to the service provision system 101 based on the service use requirement issue control table 303. This process is illustrated in FIG. 8. Each step of this process is explained below.

The service use requirement issue control part 305 determines the service provision sy6stem to issue the service use requirement and the service reject condition based on the service condition TJ03 of the service use requirement issue table 303 (S801). When the service provision system to issue the service use requirement and the service are not under the service reject condition, the service use requirement issue is requested to the service use requirement issue part 304 (S802) When the service provision system to issue the service requirement and the service are under the service reject condition, the service reject information is obtained from the service use requirement issue control table 303 (S803) and display of the reject message is requested to the user notice part 307 (S804).

The reject message display request is displayed on the display unit by means of the user notice part 307. A display image is illustrated in FIG. 4. Namely, the message stored in the reject message T304 of FIG. 3 is displayed together with the service use button D402.

Here, the reject message may be displayed as the display image as illustrated in FIG. 4 or may be noticed with voices. Namely any type of message can be used so long as it is possible to notify that the relevant service of the service provision system is rejected to users.

Figure 9:
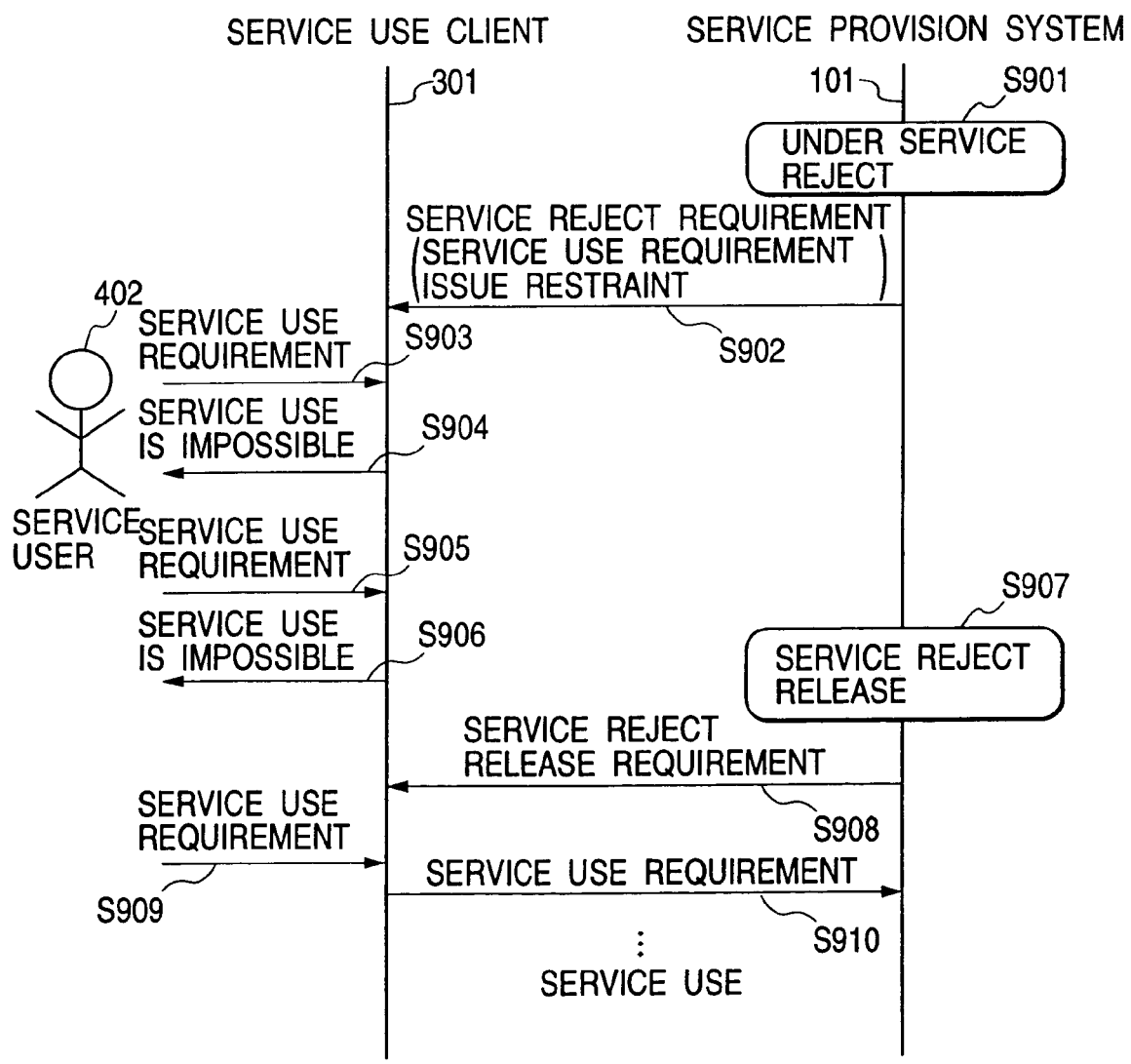
FIG. 9 is a timing chart among the service provision system and service use clients.

FIG. 9 illustrates timing chart of the service provision system 101 and service use client 301 in such a case that the class of reject of the service reject information table 104 is the service use requirement issue restraint T203.

When the load of service provisioning part 108 of the service provision system 101 exceeds the service reject start threshold value T201 to result in the service reject condition (S901), the service reject requirement is issued (S902). A user 402 issues the service use requirement to the relevant service of the service provision system (S903). However, since the service use client 301 recognizes that the service of service provision system is under the service reject condition, the service use requirement is not issued to the service provision system 101 and the service disable condition is noticed to the user (S904). In this case, as illustrated in FIG. 4, content that the service cannot be used is noticed to the user 402. The user 402 receives the notice indicating the service disabling condition and repeats the service use requirement issue (S905 to S906). The service reject condition of the service provision system 101 is released (S907) and the service reject release requirement is issued (S908). The service use client 301 accepts the service use requirement issue request from the user 402 (S909) because it has accepted the service reject release requirement and transmits the service use requirement to the service provision system 101.

Figures 11, 12:
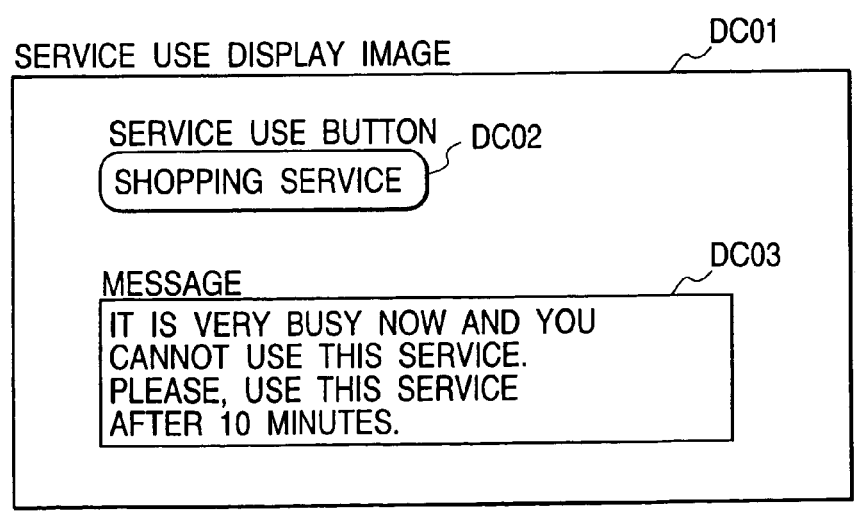
FIG. 11 is a service reject information table.
FIG. 12 is an image diagram of the service use display for notifying the service reject condition to the users.

Moreover, in the shopping service system explained above, it is also possible that the service reject information table 104 is processed as illustrated in FIG. 11. Differences from FIG. 3 are that the class of reject TB03 is the service use requirement issue fixed time restraint, content of the reject message TB04 becomes " . . . , after xxx, . . . " and therefore a value of the restraint time TB05 is given to xxx, and the restraint time TB05 is newly provided as the class of reject information. In this method, the service use client 301 restraints the service use requirement issue to the service of the service provision system for the period of restraint time TB05 by adding the restraint time TB05 to the service reject information issued from the service provision system 101. The service use client 301 issues, after elapse of the restraint time TB05, the service use requirement from the user 402 to the service provision system 101 and therefore the service reject release requirement from the service provision system 101 is unnecessary.

Figure 13:
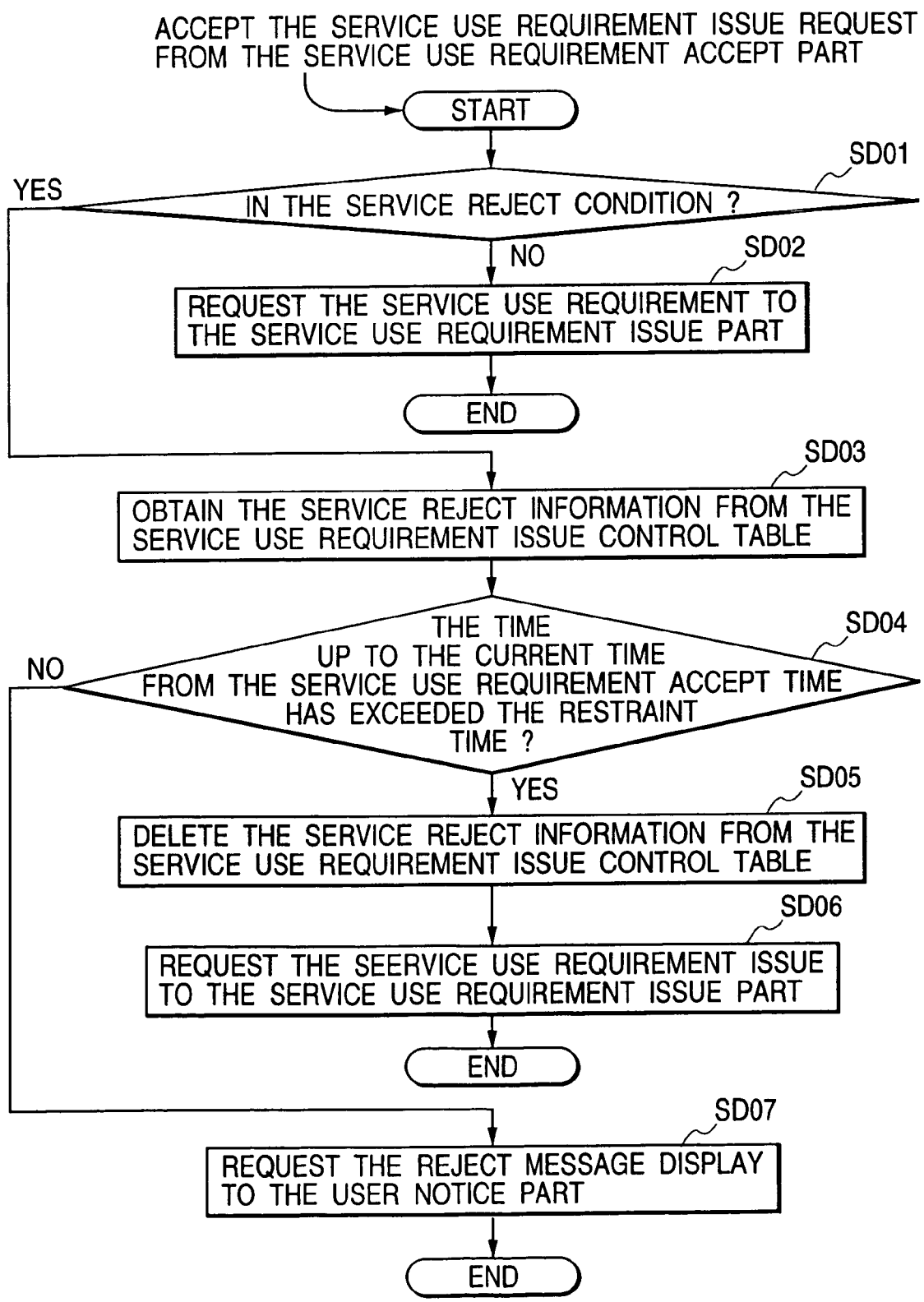
FIG. 13 is a flowchart illustrating the process of service use requirement issue control part.

The process of the service use requirement issue control part 305 when the class of reject TB03 of the service reject information table 104 is the service use requirement issue fixed time restraint is illustrated in FIG. 13. Each step of this process is explained below.

Upon acceptance of the service use requirement issue request from the service use requirement accept part 306, the service use requirement issue control part 305 determines whether the service provision system as the service use requirement issuing source and the service are in the service reject condition or not depending on the service use requirement issue table 303 (SD01). When the service provision system issuing the service use requirement and the service are not in the service reject condition, the service use requirement issue is requested to the service use requirement issue part 304 (SD02). When the service provision system issuing the service use requirement and the service are in the service reject condition, the service reject information is obtained (SD03) from the service use requirement issue control table 303, the period up to the current time from the service reject requirement accepting time TJ05 is obtained and it is determined whether the period has exceeded the restraint time or not (SD04). When the period has exceeded the restraint time, the service reject information of the service of the service provision system is deleted from the service use requirement issue control table 303 (SD05) and the service use requirement issue is requested to the service use requirement issue part 304 (SDO6).

When the period does not exceed the restraint time, display of the reject message is requested to the user notice part 307 (SDO7). The reject message is displayed with the user notice part 307. The display image is illustrated in FIG. 12. That is, the message embedding the restraint time TB05 to the reject message TB04 of FIG. 11 is displayed together with the service use button.

Figure 14:
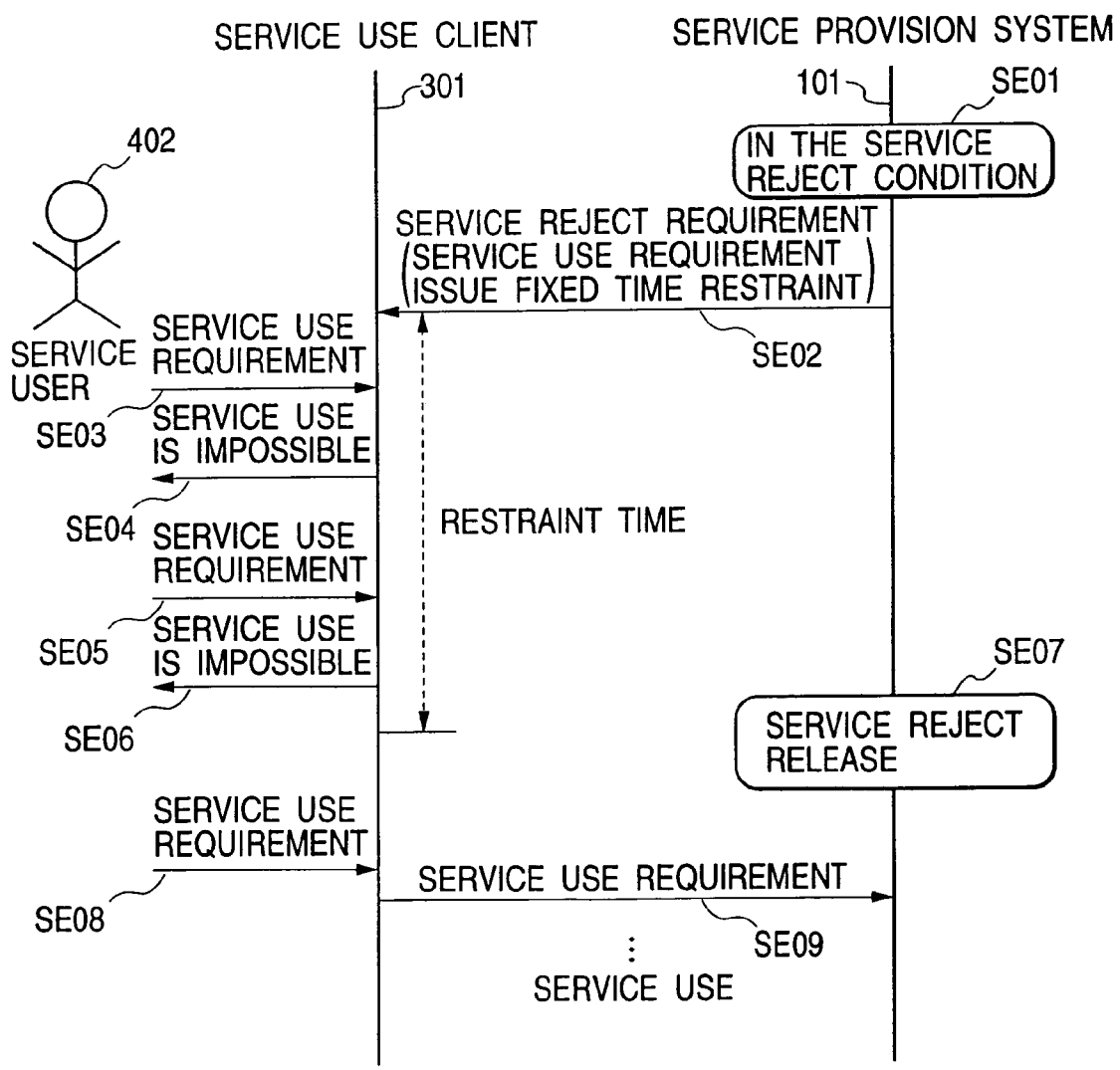
FIG. 14 is a timing chart among the service provision system and service use clients.

FIG. 14 illustrates the timing chart between the service provision system 101 and service use clients 301 in such a case that the class of reject TB03 of the service reject information table 104 is service use requirement issue fixed time restraint. Differences from FIG. 9 are that load of the service provisioning part 108 of the service provision system 101 exceeds the service reject start threshold value T201 resulting in the service reject condition (SE01) and the service use requirement from the user402 is not issued to the service provision system 101 and it is restrained in the service use client 301 during the period of restraint time from the service reject requirement issuing time (SE02). The service use requirement after exceeding the restraint time is issued to the service provision system 101 (SE08 to SE09).

Moreover, in the service reject information table of FIG. 11, it is also possible, in place of fixing the restraint time TB05, to vary the restraint time depending on the load of the service provisioning part 108. Since the load of the service provisioning part 108 may be measured periodically with the service reject control part 105, the load sometimes increases suddenly within a short period of time. Considering such increase of the load, it is possible to set, into the load threshold value table 103, the restraint time for the service reject start threshold value depending on the load of the service provisioning part 108 as illustrated in FIG. 15. That is, since when the reject start threshold value is high, load concentration is also high, the longer restraint time is set assuming that the recovery time from the load concentration is also longer. In this case, in the service reject information table 104, the class of reject TG03 is the service use requirement issue variable time restraint as illustrated in FIG. 16 and the restraint time TB05 existing in FIG. 11 is deleted. Moreover, the service reject information issued to the service use client 301 includes the restraint times of the service reject information table 301 and the load threshold value table 103 corresponding to the load of the service provisioning part 108.

Moreover, it is also possible that users are ranked previously and when the load of the service provisioning part 108 has exceeded the reject start threshold value T201, the service use requirement issue of the lower-ranked user is restrained. As illustrated in FIG. 17, in the service reject information table 104, the class of reject TH03 is the service use requirement issue rank restraint and the reject object rank TH05 is newly added. The rank indicated in this embodiment includes the highest rank A and the lowest rank C. The rank of user explained here means, for example, the rank of contribution to the amount of sales such as the goods purchasing result in the past in the shopping service system. The ranking method may be selected freely, for example, from the method to automatically give the rank based on the goods purchasing result in the past or the method in which a service operator periodically and manually sets the rank with reference to the goods purchasing result in the past. The method is not limited to the methods explained above and can introduce any type of method desired. The service reject information issued from the service provision system 101 is given the reject object rank TH05 and the service use requirement issue control part 305 of the service use client 301 determines whether own rank matches or not with the reject object rank of the service reject information issued from the service provision system 101 and also determines whether the service use requirement should be issued or not.

Figure 18:
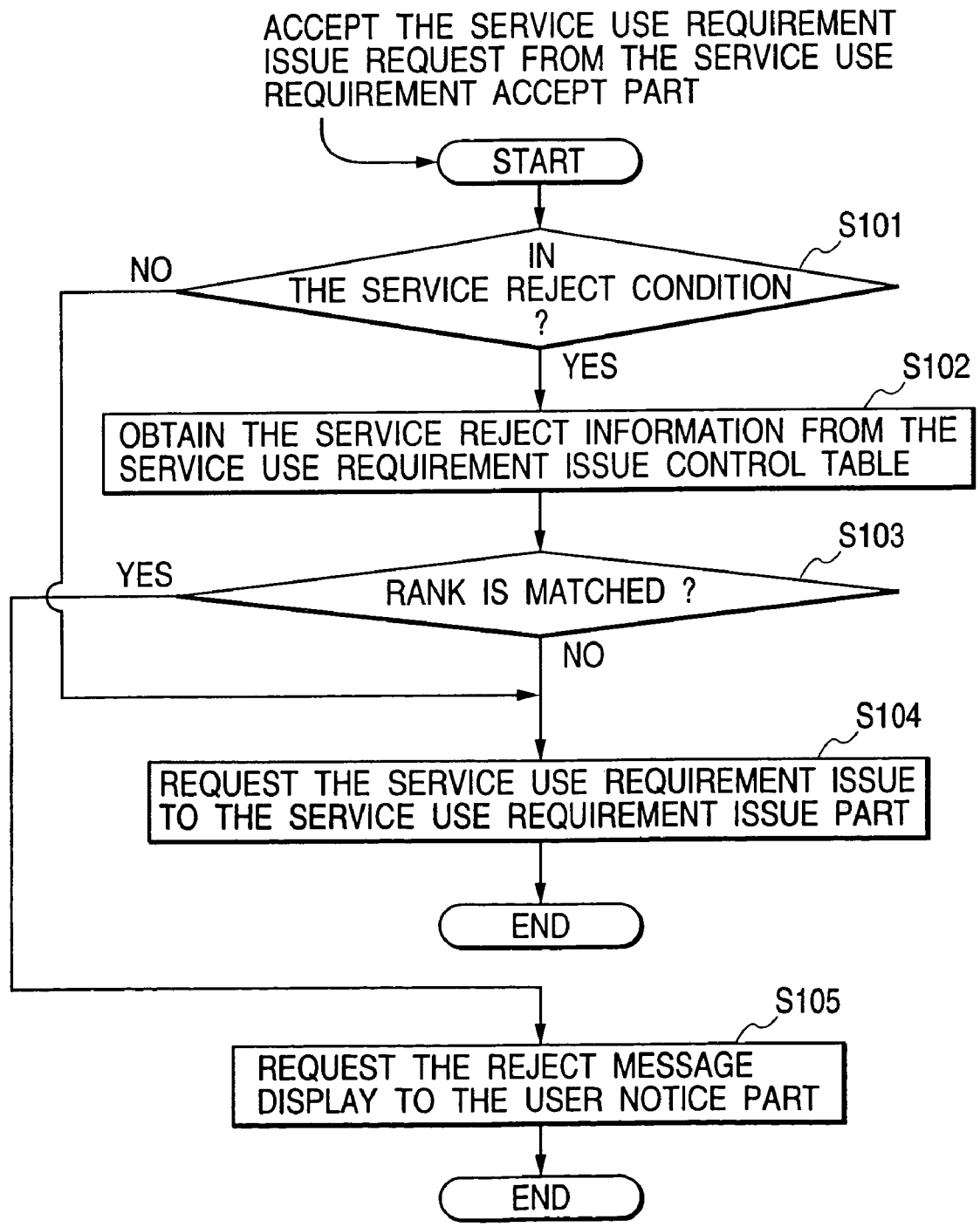
FIG. 18 is a flowchart illustrating the process of service use requirement issue control part.

FIG. 18 illustrates the process of the service use requirement issue control part 305 in the case where the class of reject TH03 of the service reject information table 104 is the service use requirement issue restraint. Each step of this process will be explained below.

Upon acceptance of the service use requirement issue request from the service use requirement accept part 306, the service use requirement issue control part 305 determines the service provision system to issue the service use requirement and the service reject condition (SI01). When the service of the service provision system is not in the service reject condition, the service use requirement issue is requested to the service use requirement issue part 304 (SI04). When the service of the service provision system is in the service reject condition, the service reject information is obtained from the service use requirement issue control table 303 (SI02) and whether the rank of the service reject object matches with own rank or not is determined (SI03). When the service reject object rank does not match own rank, the service use requirement issue is requested to the service use requirement issue part 304 (SI04). When the service reject object rank matches own rank, the reject message display is requested to the user notice part 307 (SI05).

The four kinds of methods for class of reject of the service reject information table 104 have been explained above. These four kinds of methods can be used in various manners such as that the rank of user as the reject object is varied depending on the load of the service provisioning part 108 through combination, for example, of the service use requirement issue variable time restraint and service use requirement issue rank restraint.

According to the present invention, since the service use client in the shopping service system is provided with the service connection part for connection with the service provision system, the service reject requirement is issued to the service use client before the service provision system is put into the overload condition in order to control the service use requirement issue in the service use client. Thereby, the overload condition of the service provision system can be prevented.

Moreover, the present invention can also be applied in direct to the telephone network such as the hand-held telephone network and data communication service to result in the similar effect.

In the present invention, a load is not applied on the service provision system of the information service system and it is possible to reject the service use requirement issue itself from the service use client. Moreover, it is also possible to prevent the overload condition of the service provision system.

What is claimed is:

1. A data processing system comprising:
   a plurality of clients; and
   a plurality of servers providing services to said clients;
   wherein each of said servers comprises
   a first storage device which stores service identifiers corresponding with each service provided by one of said servers and service reject information for regulating service use requirements corresponding with each of said service identifiers; and a service reject information multicasting part which multicasts to said plurality of clients, said service identifiers stored in said first storage device and said service reject information stored corresponding with each of said service identifiers if the load of each of said servers exceeds a predetermined value, wherein each of said clients which has received said service identifiers and said service reject information can issue a service use requirement for a service provided by each of said servers and wherein each of said client comprises a service use requirement issue part which sends to the server providing a service in accordance with a service use requirement from users;

a second storage device which stores said service identifiers and service reject information corresponding with each of said service identifiers; and a service use requirement issue control part which controls a service use requirement sent to the server providing a service required from a user if the service required from the user coincides with the service identified with one of said service identifiers stored in said storage device, and if service reject information corresponding with the service identifier is stored in said second storage device, wherein said plurality of clients which are targets of multicasting said service reject information include a client which does not issue a service use requirement for a service provided by each of said servers.

2. A processing system according to claim 1, wherein said load of each of said servers is acquired by a use ratio of resources of the server.

3. A processing system according to claim 1, wherein said service reject information includes service reject messages, and wherein this system further comprises a user notice part which gives users the notices according to said service reject messages.

4. A data processing system comprising:

a plurality of clients; and a plurality of servers providing services to said clients;

wherein each of said servers comprises a first storage device which stores service identifiers corresponding with each service provided by one of said servers, service reject information for regulating service use requirements corresponding with each of said service identifiers and reject object ranks corresponding with each of said identifiers; and a service reject information multicasting part which multicasts to said plurality of clients, said service identifiers stored in said first storage, said service reject information stored corresponding with each of said service identifiers and said reject object ranks corresponding with each of said service identifiers if the load of each of said servers exceeds a predetermined value, wherein each of said clients which has received said service identifiers, said service reject information and said reject object ranks can issue a service use requirement for a service provided by each of said servers and wherein each of said clients comprises a service use requirement issue part which sends to the server that provides service in accordance with a service use requirement from users;

a second storage device which stores said service identifiers, service reject information corresponding with each of said service identifiers and said reject object ranks corresponding with each of said service identifiers;

a service use requirement issue control part which controls a service use requirement sent to the server providing a service required from a user if the service required from the user coincides with the service identified with one of said service identifiers stored in said second storage device and the user's rank coincides with the reject object rank identified with one of said service identifiers stored in said second storage device, and if service reject information corresponding with the service identifier is stored in said second storage device, wherein said plurality of clients which are targets of multicasting said service reject information include a client which dose does not issue a service use requirement for a service provided by each of said servers.

5. A data processing system according to claim 4, wherein said multicast reject object ranks are changed in accordance with the load of each of said servers.

6. A data processing method for a plurality of servers providing services and a plurality of clients being able to issue service use requirements to said servers, the method comprising the steps of:

multicasting, at each of said servers, to said plurality of clients, service identifiers corresponding with each service provided by one of said servers and said service reject information corresponding with each of said service identifiers if the load of said servers exceeds a predetermined value;

storing, at each of said clients received said service identifiers and said service reject information, said service identifiers and service reject information corresponding with each of said service identifiers;

controlling, at each of said clients, a service use requirement sent to one of said servers providing a service required from a user if the service required from the user coincides with the service identified with one of said service identifiers stored in said second storage device, and if service reject information corresponding with the service identifier is stored in the client, wherein said plurality of clients which are targets of multicasting said service reject information include a client which does not issue a service use requirement for a service provided by each of said servers.

7. A data processing method according to claim 6, wherein said load of the server is acquired by a use ratio of resources of the server.

8. A data processing method according to claim 6, wherein said service reject information includes service reject messages, and wherein this method further comprises a step in which the client sent said service reject information gives users the notices according to said service reject messages.

9. A data processing method for a plurality of servers providing services and a plurality of clients being able to issue service use requirements to said servers, the method comprising the steps of:

multicasting, at each of said servers, to said plurality of clients, service identifiers corresponding with each service provided by one of said servers, said service reject information corresponding with each of said service identifiers and said reject object ranks corresponding with each of said service identifiers if the load of each of said servers exceeds a predetermined value;

receiving, at each of said clients, said service identifiers, said service reject information and said reject object ranks stores said service identifiers, service reject information corresponding with each of said service identifiers and said reject object ranks corresponding with each of said service identifiers;

controlling, at each of said clients, a service use requirement sent to the server providing a service required from a user if the service required from the user coincides with the service identified with one of said service identifiers stored in said second storage device and the user's rank coincides with the reject object rank identified with one of said service identifiers stored in said second storage device, and if service reject information corresponding with the service identifier is stored in the clients' wherein said plurality of clients which are targets of multicasting said service reject information include a client which does not issue a service use requirement for a service provided by each of said servers.

10. A data processing method according to claim 9,
wherein said multicast reject object ranks are changed in accordance with the load of said servers.

* * * * *